(12) United States Patent
Sai Krishna et al.

(10) Patent No.: US 10,930,080 B2
(45) Date of Patent: Feb. 23, 2021

(54) SYSTEM AND METHOD FOR CREATING VIRTUAL AND AUGMENTED REALITY ENVIRONMENT

(71) Applicant: SCAPiC INNOVATIONS PRIVATE LIMITED, Bengaluru (IN)

(72) Inventors: Varahur Kannan Sai Krishna, Bangalore (IN); Ajay Ponna Venkatesha, Bengaluru (IN)

(73) Assignee: SCAPIC INNOVATIONS PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/384,910

(22) Filed: Apr. 15, 2019

(65) Prior Publication Data

US 2019/0318542 A1 Oct. 17, 2019

(30) Foreign Application Priority Data

Apr. 13, 2018 (IN) .............................. 201841009237

(51) Int. Cl.
*G06T 19/00* (2011.01)
*G06T 17/10* (2006.01)
*G06K 9/62* (2006.01)
*G06K 9/00* (2006.01)

(52) U.S. Cl.
CPC ........ *G06T 19/006* (2013.01); *G06K 9/00624* (2013.01); *G06K 9/6256* (2013.01); *G06T 17/10* (2013.01); *G06T 2210/61* (2013.01); *G06T 2219/2008* (2013.01)

(58) Field of Classification Search
None
See application file for complete search history.

(56) References Cited

U.S. PATENT DOCUMENTS

| | | | |
|---|---|---|---|
| 2003/0058238 A1* | 3/2003 | Doak | A63F 13/63 345/419 |
| 2011/0231781 A1* | 9/2011 | Betzler | G06F 12/0875 715/757 |
| 2013/0141419 A1* | 6/2013 | Mount | A63F 13/25 345/419 |
| 2014/0337477 A1* | 11/2014 | Fisher | G06T 7/70 709/219 |
| 2016/0357381 A1* | 12/2016 | Coin-Perard | G06F 3/04842 |

(Continued)

*Primary Examiner* — Nurun N Flora
(74) *Attorney, Agent, or Firm* — Barry Choobin; Patent 360LLC

(57) ABSTRACT

The embodiments herein provide a system and method for generating data for a three-dimensional (3D) environment using existing information from a virtual or augmented reality scene is disclosed. The method includes reading data from a data store. The data comprising component identifying data and component position data for at least one of said 3D components. Further, the component data is analyzed for at least one identified component from a data store, the component data including at least 3D geometry data for the component. Thereafter, at least one component of the 3D geometry data is transformed using component position data to provide 3D virtual environment data for a specific 3D virtual environment. The 3D virtual environment data defines a substantially contiguous 3D surface enclosing the 3D virtual environment. The system includes a scene recognizer, parser, asset mapper, machine learning driven design algorithm, and asset store reorganizer.

11 Claims, 6 Drawing Sheets

(56) References Cited

U.S. PATENT DOCUMENTS

2016/0379270 A1\* 12/2016 Shah ................. G06Q 30/0269
                                                                          705/14.66
2018/0336411 A1\* 11/2018 Schuh ................... H04N 5/232

\* cited by examiner

SYSTEM AND METHOD FOR CREATING VIRTUAL AND AUGMENTED REALITY ENVIRONMENT

CROSS-REFERENCE TO RELATED APPLICATION

The embodiments herein claim the priority of the Indian Provisional Patent application with serial number: 201841009237 filed on Mar. 13, 2018 and subsequently postdated by 1 Month to Apr. 13, 2018 with the title, "A VIRTUAL REALITY ENVIRONMENT DEVELOPMENT PLATFORM AND METHOD THEREOF", and the contents of which is incorporated in entirety as reference herein.

BACKGROUND

Technical Field

The embodiments herein are generally related to virtual reality and augmented reality systems. The embodiments herein are generally related to a platform for developing virtual reality and augmented reality contents. The embodiments herein are more particularly related to a system and method for creating virtual reality or augmented reality contents easily and automatically.

Description of the Related Art

In the recent years, a processing power and capabilities of the microprocessors are improved to enable the users to implement real-time environments using three-dimensional graphics on the personal computers and consoles. Thus, there has been a rapid growth in the fields of Virtual reality (VR) and Augmented Reality (AR) despite the substantial effort involved in creating a new experience. Typically, VR and AR systems require a creation of a realistic and convincing environment to immerse a viewer and which is a time-consuming process. Although a development of the VR/AR systems have taken many years, the market is nonetheless very fast paced and a new AR/VR experience/systems have a lifetime of only a few months for earning a significant revenue. Thus, it is required to speed up the process of creation of VR/AR environments to achieve significant revenue from the VR/AR market.

In a virtual reality scene, the environment through which the viewer moves is characterized by a visual geometry onto which colours and textures are mapped. Further, the environment is also provided with lighting effects such as a combination of painting on lights, lights onto the visual geometry, and locally modifying texture, colour and/or intensity in the vicinity of the lights. The artificially generated environment includes a Virtual or Augmented reality scene, comprising the elements ranging from 2D elements, 3D objects, vectors, text and illustrations. Additionally, the environment is tweaked in lighting, dynamic suggestion of audios and animation of elements in the environment.

Typically, the three-dimensional graphic is implemented through a 3D graphics engine which provides 3D application program interface (API) calls for controlling the hardware of a computer system to display three-dimensional graphics either on a visual display unit or, a console or a television for a AR/VR experiences. Common 3D graphics languages include OpenGL (from Silicon Graphics, Inc.) and Direct3D (from Microsoft Corporation) (trade marks). Alternatively, such graphics are implemented entirely by a proprietary code. A computer engine, such as an VR/AR application, generally comprises data defining the AR/VR experience's environment and operation. An AR/VR experience engine is configured to be operated on the AR/VR experience data to provide the specified AR/VR experience functionality, such as NPC artificial intelligence, AR/VR experience physics, and the like. The AR/VR experience engine is configured to make 3D graphics languages API calls for displaying the AR/VR experience's virtual environment on-screen to the player.

The data types used by the machine learning engine for recommending, designing and presenting virtual reality environments includes geometry data, texture data, etc. The Geometry data defines the physical (geometrical) appearance of the scene and this physical geometry is typically formed from surfaces comprising a plurality of triangles, quadrilaterals, or polygons. Texture data provide the images of different types of material which are applied to the scene geometry to create a more realistic appearance for the virtual environment of the scene. In order to facilitate the smooth running of the AR/VR experience, visibility information is provided to allow the 3D processing engine to process and display part of the scene which is visible on the screen. There are several known methods for achieving this and these usually involve splitting-up the geometry and other data into groups so that data in a non-visible group need not be processed.

The existing methods for creating a scene in an AR/VR experience/environment include manually creating texture data and geometry data for each one of the virtual and augmented reality scenes individually. For example, the method includes creating an AR/VR experience scene editor software package or a commercial 3D design package. However, the existing methods consume about six months for creating geometry for the experience. When the geometry and other data are not perfect, that is self-consistent and defining a complete, closed environment, the experience does not work properly or at all. For example, visual artifacts are left while the defective geometry, such as inconsistent or incomplete geometry, reduces the immersive nature of the virtual or augmented reality experience. The public domain and proprietary tools for editing AR/VR experience scene facilitate the scene construction process but the task is nevertheless slow and laborious. It is also difficult for inexperienced developers to know the process of optimizing the data for an application in order to run the AR/VR experience runs relatively smoothly and not too slowly. Hence there is a need for a system for constructing virtual environments at par with the AR/VR experiences built by semi-professionals, brands, businesses and enterprises.

Hence, there is a need for a system and method for automatically constructing virtual environments for VR/AR applications. Further, there exists a need for a system for developing/providing templates/platforms for easy creation and manipulation of virtual environments. Furthermore, there exists a need for a system and method that provides artificial intelligence for a scene or a design assistant to contextually add elements to the created virtual or augmented reality scene/environments.

The above mentioned shortcomings, disadvantages and problems are addressed herein and which will be understood by reading and studying the following specification.

OBJECTS OF THE EMBODIMENTS

The primary object of the embodiments herein is to provide a method and system for constructing virtual environments or augmented reality scene.

Another object of the embodiments herein is to provide a method and system for transforming, a 3D geometry data for generating a plurality of components in a virtual environment.

Yet another object of the embodiments herein is to provide a method and system for creating the virtual environment from pre-built and pre-tested three-dimensional (3D) components.

Yet another object of the embodiments herein is to provide a machine learning algorithm for creating AI or design assistant to contextually add elements to the created virtual or augmented reality scene.

Yet another object of the embodiments herein is to provide a method and system with inbuilt templates of 3D scenes and building blocks for creating virtual or augmented reality environment.

Yet another object of the embodiments herein is to provide a method and system to create virtual or augmented reality environments including audio, and text.

Yet another object of the embodiments herein is to provide a method and system for receiving the instructions and data from a user for specifying assembly of building blocks across a scene to automatically generate a virtual environment.

Yet another object of the embodiments herein is to provide a method and system for generation of virtual reality environment quickly in minutes when compared with the conventional methods.

Yet another object of the embodiments herein is to provide a method and system for providing contextual suggestions in a virtual and augmented reality scene.

These and other objects and advantages of the embodiments herein will become readily apparent from the following detailed description taken in conjunction with the accompanying drawings.

SUMMARY

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a system for generating virtual environment and providing suggestions for creating/improving a Virtual and Augmented reality scene. The system comprises a scene recognizer module configured for receiving a scene as an input from a user. The user is enabled to upload one or more new scenes or select one or more existing scenes from a predefined list of scenes available in an asset store. The scene recognizer is configured for analyzing the one or more scenes to identify scene intents and scene entity. The system also comprises a parser module coupled to the scene recognizer. The parser module is configured for converting the scene intents and scene entities into a format compatible with an editor of the asset store. The system further comprises an asset mapping module coupled to the parser module. The asset mapping module comprises a plurality of pre-trained data sets and one or more machine learning algorithms. The asset mapping module is configured for additively/additionally generating a new scene from the scene intents and scene entities using pre-trained data sets and one or more machine learning algorithms. The system still further comprises a display module coupled to the asset mapping module. The display module is configured for displaying the generated scene to the user for selection. Upon selection by the user, the scene is previewed with appropriate toggles to select, unselect and revert selections for generating the scene with desired effects.

According to an embodiment herein, the scene intent comprises holistic image recognition of the scene and the scene entity comprises one or more individually recognized elements in the scene. The recognized elements in the scene further comprise identifying 3D component geometry data and position data.

According to an embodiment herein, the 3D component geometry data of the recognized element is transformed using position data to provide 3D virtual environment data for a specific 3D virtual environment.

According to an embodiment herein, the asset store comprises a catalog of 3D component geometry data with one or more visual appearances. The one or more visual appearances are provided by a plurality of textures.

According to an embodiment herein, the 3D component geometry data comprises data for at least two sets of 3D components preferably with the same basic connectivity and general shape but with one or more visual appearances.

According to an embodiment herein, each component is theme-able. Each 3D component's visual appearance is varied based on the surrounding look and feel.

According to an embodiment herein, the 3D virtual environment data defines a substantially contiguous 3D surface enclosing the 3D virtual environment.

According to an embodiment herein, the new scene generated by the system further comprises one or more unique characteristics. The one or more unique characteristics comprise scene effects, 2D scene element, 3D scene element and scene descriptor text.

According to an embodiment herein, the system is configured for providing continuous contextual recommendations based on user actions and preferences. The contextual recommendations consider/treat the selection choices made by user as a weighted average to reorganize the content with reference to scene intent and scene entities in the asset store.

According to an embodiment herein, a method for generating virtual environment and for providing suggestions in a Virtual and Augmented reality scene is provided. The method comprises the steps of receiving a scene as an input from a user. The user is enabled to upload one or more new scenes or select one or more existing scenes from a predefined list of scenes available in an asset store. The method also comprises analyzing the one or more scenes to identify scene intents and scene entity. The scene intent comprises holistic image recognition of the scene and the scene entity comprises one or more individually recognized elements in the scene. The step of recognizing elements in the scene further comprises identifying 3D component geometry data and position data. The method further comprises transforming at least one component of the 3D component geometry data using position data to provide 3D virtual environment data for a specific 3D virtual environment. The method still further comprises combining the transformed data to provide 3D virtual environment data for said 3D virtual environment.

According to an embodiment herein, each component comprises one or more interface portions for interfacing to other components.

According to an embodiment herein, the method further comprises the step of enabling a component geometry to close the interface when the interface is not used to connect to another component using the interface portion. The interface portion is associated with a plug comprising a plug data.

According to an embodiment herein, the method further comprises the step of mapping the scenes into a pre-trained dataset using an asset mapper. The asset mapping module is configured for additively/additionally generating a new scene from the scene intents and scene entities. The new scene comprises one or more unique characteristics. The one or more characteristics comprise scene effects, 2D scene element, 3D scene element, and scene descriptor text.

According to an embodiment herein, the method further comprises the step of displaying the generated scene to the user for selection.

According to an embodiment herein, the method further comprises the step of previewing the selected scene to the user with appropriate toggles to select, unselect and revert selections for generating the scene with desired effects.

The various embodiments herein provide a method and system for constructing virtual environments or augmented reality scene. The method envisaged by the present disclosure transforms a 3D geometry data for the plurality of components in a virtual environment. Further, the system envisaged by the embodiments herein enables to create virtual environment from pre-built and pre-tested three-dimensional (3D) components. The system includes a machine learning algorithm that provides an intelligent scene AI or design assistant to contextually add elements to the virtual or augmented reality scene. Further, the system includes inbuilt templates of 3D scenes for creating the virtual environment.

According to an embodiment herein, the system receives instructions and data from user for specifying assembly of building blocks across a scene to automatically generate a virtual environment. The virtual reality environments created using the embodiments herein is configured to host audio files and text files.

According to an embodiment herein, a method of generating data for a three-dimensional (3D) environment using existing information from a virtual or augmented reality scene is disclosed. The method includes reading data from a data store. The data comprising component identifying data and component position data for at least one of said 3D components. Further, the component data is analyzed for at least one identified component from a data store. The component data includes at least 3D geometry data for the component. Thereafter, at least one component of the 3D geometry data is transformed using component position data to provide 3D virtual environment data for a specific 3D virtual environment. The 3D virtual environment data defines a substantially contiguous 3D surface enclosing the 3D virtual environment. Thus, the method enables generation of 3D virtual reality environment in minutes.

According to an embodiment herein, the system includes a Machine Learning algorithm for designing a virtual reality environment. The Machine Learning algorithm enables effective understanding of the scene and provides an intelligent scene AI or design assistant to contextually add elements to the designed virtual or augmented reality scene.

According to an embodiment herein, the system provides pre-built and pre-tested 3D components that are readily arranged based on user requirements. Thus, the system allows a user without technical skills or a semi-skilled worker/operator to easily construct a virtual environment by using data that specifies the assembly of building blocks across a scene.

According to an embodiment herein, the system for generation of virtual environment and providing contextual suggestions in a Virtual and Augmented reality scene includes a scene recognizer, parser, asset mapping module, machine learning driven design algorithm, and asset store reorganizer. The system receives scene uploaded by a user as input. Also, the user is enabled to select scenes from a predefined list of scenes available in the asset store. The selected or uploaded scene is fed as input to the scene recognizer. The scene recognizer analyses the scenes to identify scene intents and scene entity. The scene intent comprises of holistic image recognition of a scene. The scene entity comprises of individual recognized elements in a scene. The intents and entities are provisioned through a parser that converts them into a format compatible with the editor of the asset store. Further, the asset mapping module comprises pre-trained data sets that additively generates a new scene from the intents and entities. The new scene generated has 4 unique characteristics such as scene effects, 2D scene element, 3D scene element, and scene descriptor text. In Scene effects, the scene is modified with lighting and visual filters into a desired format. Further, the scene elements are provisioned across 3D and 2D elements ranging from volumetric 3D models, shapes and other assets present in the store that enables to define the scene in additional entity driven detail. The generated scenes after applying scene effects, scene elements, and scene descriptor text are displayed to the user across three different scenes for selection. Once the user selects a scene provided by design suggestion, the scene is previewed over the existing option with appropriate toggles to select, unselect and revert selections. On completion of scene selection, the selection choice is taken into consideration/account as a weighted average for the asset store to reorganize the contents with reference to the scene intent and scene entities provided/supplied. This allows for a continuous contextual recommendation process that is constantly updated through the user actions and preferences.

According to an embodiment herein, the component data comprises data for at least two sets of 3D components, preferably with the same basic connectivity and preferably with the same general shape, but with different visual appearances. The different visual appearances are provided by different textures, and further the sets of components have different internal geometries. Thus, virtual environments with varied visual appearances are created from a single map by selecting one of the components in constructing the virtual environment. The representation of this data occurs through a conversational layer on top of existing software or mechanisms to allow for seamless access. Preferably the components in each set have a similar themed/thematic visual appearance to provide a themed "look and feel" to an environment constructed using the set of components. Examples of sets of 3D components include an industrial environment, a gothic environment, a space port environment, and an alien environment, each of which is generated from the same principal scene reference by the machine learning generator.

According to an embodiment herein, the system provides a plurality of designs or 3D components based on a user behavior pattern recognized by machine learning.

According to an embodiment herein, a method of generating data for a three-dimensional (3D) virtual environment using a map of 3D components is disclosed. The method includes reading map data from a data store. The map data comprising a component set data for identifying the set of 3D components for use in generating said 3D virtual environment data, a component identifying data and a component position data for said 3D components. Further, data store component data for the identified components is read from the identified set, and the component data including at least 3D geometry data for the components. The 3D geometry data of the said components is transformed using said component position data. The transformed data is combined to provide D virtual environment data for said 3D virtual environment.

According to an embodiment herein, a method of generating data for a three-dimensional (3D) virtual environment using a map of 3D components with interface portions is disclosed. Each component includes one or more interface portions for interfacing to other components. The interface portion have an associated plug comprising plug data for providing component geometry to close the interface when the interface is not used to connect to another component. The method includes reading map data from a data store. The map data comprising component identifying data and component position data for said 3D components. The component data for the identified components from a data store is read for the component data including 3D geometry data for the components. The plug data is read for a component on the map with one or more interfaces not connected to other components. The 3D geometry data is transformed into various components using said component position data. The transformed data is combined to provide 3D virtual environment data for said 3D virtual environment.

According to an embodiment herein, by transforming the plug data of the components and the 3D geometry data, unused interfaces of components is automatically closed off, thereby providing a fully enclosed and bound virtual environment for the AR/VR experience. Thus, it is possible to ensure that each map of components, irrespective of their relative arrangement, generates a fully working experience without the need of weeks for testing.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

BRIEF DESCRIPTION OF THE DRAWINGS

The other objects, features and advantages will occur to those skilled in the art from the following description of the preferred embodiment and the accompanying drawings in which.

Figure 1:
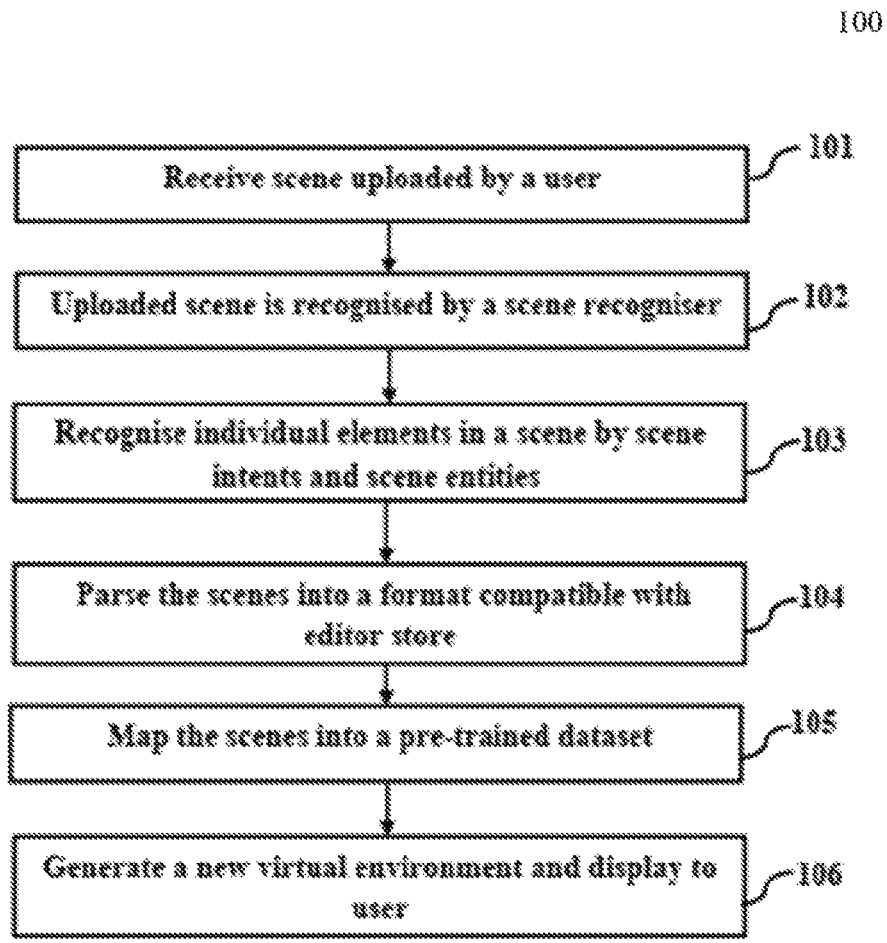
FIG. 1 illustrates a flowchart explaining a method for generation of the virtual environment and providing contextual suggestions in a Virtual and Augmented reality scene, according to one embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for generating virtual environment and providing suggestions for creating/improving a Virtual and Augmented reality scene. The system comprises a scene recognizer module configured for receiving a scene as an input from a user. The user is enabled to upload one or more new scenes or select one or more existing scenes from a predefined list of scenes available in an asset store. The scene recognizer is configured for analyzing the one or more scenes to identify scene intents and scene entity. The system also comprises a parser module coupled to the scene recognizer. The parser module is configured for converting the scene intents and scene entities into a format compatible with an editor of the asset store. The system further comprises an asset mapping module coupled to the parser module. The asset mapping module comprises a plurality of pre-trained data sets and one or more machine learning algorithms. The asset mapping module is configured for additively/additionally generating a new scene from the scene intents and scene entities using pre-trained data sets and one or more machine learning algorithms. The system still further comprises a display module coupled to the asset mapping module. The display module is configured for displaying the generated scene to the user for selection. Upon selection by the user, the scene is previewed with appropriate toggles to select, unselect and revert selections for generating the scene with desired effects.

According to an embodiment herein, the scene intent comprises holistic image recognition of the scene and the scene entity comprises one or more individually recognized elements in the scene. The recognized elements in the scene further comprise identifying 3D component geometry data and position data.

According to an embodiment herein, the 3D component geometry data of the recognized element is transformed using position data to provide 3D virtual environment data for a specific 3D virtual environment.

According to an embodiment herein, the asset store comprises a catalog of 3D component geometry data with one or more visual appearances. The one or more visual appearances are provided by a plurality of textures.

According to an embodiment herein, the 3D component geometry data comprises data for at least two sets of 3D components preferably with the same basic connectivity and general shape but with one or more visual appearances.

According to an embodiment herein, each component is theme-able. Each 3D component's visual appearance is varied based on the surrounding look and feel.

According to an embodiment herein, the 3D virtual environment data defines a substantially contiguous 3D surface enclosing the 3D virtual environment.

According to an embodiment herein, the new scene generated by the system further comprises one or more unique characteristics. The one or more unique characteristics comprise scene effects, 2D scene element, 3D scene element and scene descriptor text.

According to an embodiment herein, the system is configured for providing continuous contextual recommendations based on user actions and preferences. The contextual recommendations consider/treat the selection choices made by user as a weighted average to reorganize the content with reference to scene intent and scene entities in the asset store.

According to an embodiment herein, a method for generating virtual environment and for providing suggestions in a Virtual and Augmented reality scene is provided. The method comprises the steps of receiving a scene as an input from a user. The user is enabled to upload one or more new scenes or select one or more existing scenes from a predefined list of scenes available in an asset store. The method also comprises analyzing the one or more scenes to identify scene intents and scene entity. The scene intent comprises holistic image recognition of the scene and the scene entity comprises one or more individually recognized elements in the scene. The step of recognizing elements in the scene further comprises identifying 3D component geometry data and position data. The method further comprises transforming at least one component of the 3D component geometry data using position data to provide 3D virtual environment data for a specific 3D virtual environment. The method still further comprises combining the transformed data to provide 3D virtual environment data for said 3D virtual environment.

According to an embodiment herein, each component comprises one or more interface portions for interfacing to other components.

According to an embodiment herein, the method further comprises the step of enabling a component geometry to close the interface when the interface is not used to connect to another component using the interface portion. The interface portion is associated with a plug comprising a plug data.

According to an embodiment herein, the method further comprises the step of mapping the scenes into a pre-trained dataset using an asset mapper. The asset mapping module is configured for additively/additionally generating a new scene from the scene intents and scene entities. The new scene comprises one or more unique characteristics. The one or more characteristics comprise scene effects, 2D scene element, 3D scene element, and scene descriptor text.

According to an embodiment herein, the method further comprises the step of displaying the generated scene to the user for selection.

According to an embodiment herein, the method further comprises the step of previewing the selected scene to the user with appropriate toggles to select, unselect and revert selections for generating the scene with desired effects.

The various embodiments herein provide a method and system for constructing virtual environments or augmented reality scene. The method envisaged by the present disclosure transforms a 3D geometry data for the plurality of components in a virtual environment. Further, the system envisaged by the embodiments herein enables to create virtual environment from pre-built and pre-tested three-dimensional (3D) components. The system includes a machine learning algorithm that provides an intelligent scene AI or design assistant to contextually add elements to the virtual or augmented reality scene. Further, the system includes inbuilt templates of 3D scenes for creating the virtual environment.

According to an embodiment herein, the system receives instructions and data from user for specifying assembly of building blocks across a scene to automatically generate a virtual environment. The virtual reality environments created using the embodiments herein is configured to host audio files and text files.

According to an embodiment herein, a method of generating data for a three-dimensional (3D) environment using existing information from a virtual or augmented reality scene is disclosed. The method includes reading data from a data store. The data comprising component identifying data and component position data for at least one of said 3D components. Further, the component data is analyzed for at least one identified component from a data store. The component data includes at least 3D geometry data for the component. Thereafter, at least one component of the 3D geometry data is transformed using component position data to provide 3D virtual environment data for a specific 3D virtual environment. The 3D virtual environment data defines a substantially contiguous 3D surface enclosing the 3D virtual environment. Thus, the method enables generation of 3D virtual reality environment in minutes.

According to an embodiment herein, the system includes a Machine Learning algorithm for designing a virtual reality environment. The Machine Learning algorithm enables effective understanding of the scene and provides an intelligent scene AI or design assistant to contextually add elements to the designed virtual or augmented reality scene.

According to an embodiment herein, the system provides pre-built and pre-tested 3D components that are readily arranged based on user requirements. Thus, the system allows a user without technical skills or a semi-skilled worker/operator to easily construct a virtual environment by using data that specifies the assembly of building blocks across a scene.

According to an embodiment herein, the system for generation of virtual environment and providing contextual suggestions in a Virtual and Augmented reality scene includes a scene recognizer, parser, asset mapping module, machine learning driven design algorithm, and asset store reorganizer. The system receives scene uploaded by a user as input. Also, the user is enabled to select scenes from a predefined list of scenes available in the asset store. The selected or uploaded scene is fed as input to the scene recognizer. The scene recognizer analyses the scenes to identify scene intents and scene entity. The scene intent comprises of holistic image recognition of a scene. The scene entity comprises of individual recognized elements in a scene. The intents and entities are provisioned through a parser that converts them into a format compatible with the editor of the asset store. Further, the asset mapping module comprises pre-trained data sets that additively generates a new scene from the intents and entities. The new scene generated has 4 unique characteristics such as scene effects, 2D scene element, 3D scene element, and scene descriptor text. In Scene effects, the scene is modified with lighting and visual filters into a desired format. Further, scene elements are provisioned across 3D and 2D elements ranging from volumetric 3D models, shapes and other assets present in the store that enables to define the scene in additional entity driven detail. The generated scenes after applying scene effects, scene elements, and scene descriptor text are displayed to the user across three different scenes for selection. Once the user selects a scene provided by design suggestion, the scene is previewed over the existing option with appropriate toggles to select, unselect and revert selections. On completion of scene selection, the selection choice is taken into consideration/account as a weighted average for the asset store to reorganize the contents with reference to the scene intent and scene entities provided/supplied. This allows for a continuous contextual recommendation process that is constantly updated through the user actions and preferences.

According to an embodiment herein, the component data comprises data for at least two sets of 3D components, preferably with the same basic connectivity and preferably with the same general shape, but with different visual appearances. The different visual appearances are provided by different textures, and further the sets of components have different internal geometries. Thus, virtual environments with varied visual appearances are created from a single map by selecting one of the components in constructing the virtual environment. The representation of this data occurs through a conversational layer on top of existing software or mechanisms to allow for seamless access. Preferably the components in each set have a similar themed/thematic visual appearance to provide a themed "look and feel" to an environment constructed using the set of components. Examples of sets of 3D components include an industrial environment, a gothic environment, a space port environment, and an alien environment, each of which is generated from the same principal scene reference by the machine learning generator.

According to an embodiment herein, the system provides a plurality of designs or 3D components based on a user behavior pattern recognized by machine learning.

According to an embodiment herein, a method of generating data for a three-dimensional (3D) virtual environment using a map of 3D components is disclosed. The method includes reading map data from a data store. The map data comprising a component set data for identifying the set of 3D components for use in generating said 3D virtual environment data, a component identifying data and a component position data for said 3D components. Further, data store component data for the identified components is read from the identified set, and the component data including at least 3D geometry data for the components. The 3D geometry data of the said components is transformed using said component position data. The transformed data is combined to provide D virtual environment data for said 3D virtual environment.

According to an embodiment herein, a method of generating data for a three-dimensional (3D) virtual environment using a map of 3D components with interface portions is disclosed. Each component includes one or more interface portions for interfacing to other components. The interface portion have an associated plug comprising plug data for providing component geometry to close the interface when the interface is not used to connect to another component. The method includes reading map data from a data store. The map data comprising component identifying data and component position data for said 3D components. The component data for the identified components from a data store is read for the component data including 3D geometry data for the components. The plug data is read for a component on the map with one or more interfaces not connected to other components. The 3D geometry data is transformed into various components using said component position data. The transformed data is combined to provide 3D virtual environment data for said 3D virtual environment.

According to an embodiment herein, by transforming the plug data of the components and the 3D geometry data, unused interfaces of components is automatically closed off, thereby providing a fully enclosed and bound virtual environment for the AR/VR experience. Thus, it is possible to ensure that each map of components, irrespective of their relative arrangement, generates a fully working experience without the need of weeks for testing.

FIG. 1 illustrates a flowchart illustrating a method for generation of virtual environment and providing contextual suggestions in a Virtual and Augmented reality scene, according to one embodiment herein. With respect to FIG. 1, the user input in the form of 3D images is received (101). Also, the user is enabled to select scenes from a predefined list of scenes available in the asset store. The selected or uploaded scene is fed as input to the scene recognizer. The scene recognizer analyses the scenes to identify scene intents and scene entity (102). Further, individual elements in a scene are recognized by scene intents and scene entities using a scene recognizer (103). The scene intent comprises of a holistic image recognition of a scene. The scene entity comprises of individual recognized elements in a scene. The intents and entities are provisioned through a parser that converts them into a format compatible with the editor of the asset store (104). Further, the scenes are mapped into a pre-trained dataset using an asset mapper (105). The asset mapper additively generates a new scene from the intents and entities. The new scene generated has 4 unique characteristics such as scene effects, 2D scene element, 3D scene element, and scene descriptor text. In Scene effects, the scene is modified with lighting and visual filters into a desired format. Further, scene elements are provisioned across 3D and 2D elements ranging from volumetric 3D models, shapes and other assets present in the store that enables to define the scene in additional entity driven detail. The generated scenes after applying scene effects, scene elements, and scene descriptor text are displayed to the user across three different scenes for selection (106). Once the user selects a scene provided by design suggestion, the scene is previewed over the existing option with appropriate toggles to select, unselect and revert selections. On completion of scene selection, the selection choice is taken into consideration as a weighted average for the asset store to reorganize the contents with reference to the intent and entities provided. This allows for a continuous contextual recommendation process that is constantly updated through the user actions and preferences.

According to one embodiment herein, the method is used to compile mapped data into a 3D virtual environment based on user specifications or build up data input by a user to build-up the virtual environment component. The 3D components of each visually different component set are preferably represented similarly on the map. The component position data specifies a position in two dimensions. In another example, the virtual environment comprises rooms on different horizontal scenes, positions in three dimensions is specified. The component geometry data in the above method typically comprise visible geometry data for texture mapping and visible rendering, or invisible geometry data. For example, the geometry data defines walls or floors of a room or rooms within the virtual environment, part of a surface providing an "external" boundary for the three-dimensional virtual environment of, for example, the AR/VR experience. The geometry data is transformed into the space of the 3D virtual environment, termed as "world space", and the transformed data is further combined to join the 3D components to provide data defining a surface enclosing the 3D virtual environment.

According to an embodiment herein, the geometry data includes lists of points defining polygons, procedural geometry data, or a combination thereof. Procedural geometry data typically comprises data defining geometry in terms of parametric lines and surfaces, such as data for start and end points and an equation for a line to define a curve for an arch. The surface enclosing the virtual environment is preferably contiguous without a break at component interfaces thus providing a "closed world". Typically, an environment for a computer AR/VR experience character is to provide a defined space, world, or universe within which actions, events, and motion may take place. Thus, AR/VR experiences enable to visually depict sky within a virtual world this is merely an illusion formed by mapping an appropriate texture onto a surface.

According to an embodiment herein, each of the components has an interface portion for interfacing to other components, the component data including two versions of geometry data for the interface portion. A first version may simply define an open interface whilst a second version defines a plugged or closed interface for use in constructing the virtual environment when the component is not joined at that interface to another component. Two versions of interface geometry or the complete component geometry are stored for virtual environment generation. In another scenario, if the component has more than one interface, a number of different versions of geometry data for the component corresponding to a number of different possible interface configurations are stored for developing virtual environments.

The 3D components comprise a set of substantially matching interfaces. In an example, the 3D components are divided into two subsets, one with a first type of interface and another with a second type of interface. In another example, at least one component includes both types of interface. The geometry data preferably comprises both visible geometry data for generating visible parts of the 3D virtual environment and invisible geometry data. The invisible geometry data is not directly visible although its effects may be indirectly detectable through their effect on player or non-player characters. The component data preferably includes additional VR/AR operation-related data such as collision data for use in determining allowed player character movements, navigation data for non-player characters, and portal data for determining parts of the 3D virtual environment to consider as potentially visible, for rendering. The additional VR/AR operation-related data normally has a geometric or 2D or 3D positional aspect is transformed to co-ordinates in the virtual environment or AR/VR experience world space. In a preferred embodiment of the method, when the components are assembled according to the map data to create the three-dimensional virtual environment the AR/VR experience operation-related data is also combined to operationally link parts of the 3D virtual environment derived from different components. Further, linking navigational pads derived from different components are linked, or include rationalizing portal data to remove excess or unwanted portals such as portals which are effectively duplicated by joining two components. Such rationalization of portals may be performed before or after transforming the AR/VR experience operation-related data into AR/VR experience world space. The portal data either determine parts of the virtual environment which must be rendered for potential screen display or, determine parts of the virtual environment which need not be rendered for potential screen display. Typically, 3D transformations transform AR/VR experience to operation-related data into world space.

According to an embodiment herein, the virtual environment is broken down into 3D components to facilitate a number of optimizations of the 3D virtual environment data for a AR/VR experience scene, navigation, collision, and rendering optimization. The modular structure of the environment leads to collision geometry and navigational pad positioning having a modular, structured arrangement which tends to work better than the less structured arrangements generally produced when manually creating a scene from scratch. The modular components preferably incorporate viewing portals at their interfaces to other components, effectively imposing a structure of portals on the virtual environment geometry which would in general not be incorporated when manually constructing a scene. Furthermore, since processing portal data imposes a load on the AR/VR experience engine, portals are positioned so that they are not too large but still usefully subdivide the virtual environment into graphically meaningful zones. This is achieved by positioning portals in doorways, at the entrances to passageways, and other similar locations. Further, portals are usually automatically placed in good or approaching optimal positions within the virtual environment whatever the internal geometry of the components or the overall structure of the environment. Portals at the interfaces generally subdivide the environment into geometrically and graphically meaningful zones in general without the portal size being unduly large. Thus, optimization arises naturally from the modular component-based structure of the virtual environment. For example, a large space constructed from a number of small components will include a large number of interfaces within the space which will often be inefficient in terms of computational processing power required for the environment and in terms of memory usage.

According to an embodiment herein, the component data comprises data for at least two sets of 3D components, preferably with the same basic connectivity and preferably with the same general shape, but with different visual appearances. The different visual appearances is provided by different textures, and further the sets of components have different internal geometries. Thus virtual environments with varied visual appearances are created from a single map by selecting one of the components in constructing the virtual environment. The representation of this data occurs through a conversational layer on top of existing software or mechanisms to allow for seamless access. Preferably the components in each set have a similar themed visual appearance to provide a themed "look and feel" to an environment constructed using the set of components. Examples of sets of 3D components include an industrial environment, a gothic environment, a space port environment, and an alien environment, each generated from the same principal scene reference by the machine learning generator. In another embodiment, the system provides a plurality of designs or 3D components based on a user behavior pattern recognized by machine learning.

According to an embodiment herein, a method of generating data for a three-dimensional (3D) virtual environment using a map of 3D components is disclosed. The method includes reading map data from a data store. The map data comprising a component set data identifying a said set of 3D components for use in generating said 3D virtual environment data, component identifying data and component position data for said 3D components. Further, data store component data for the identified components is read from the identified set, the component data including at least 3D geometry data for the components. The 3D geometry data of the said components is transformed using said component position data. The transformed data is combined to provide 3D virtual environment data for said 3D virtual environment.

According to an embodiment herein, a method of generating data for a three-dimensional (3D) virtual environment using a map of 3D components with interface portions is disclosed. Each component includes one or more interface portions for interfacing to other components. The interface portion includes an associated plug comprising plug data for providing component geometry to close the interface when the interface is not used to connect to another component. The method includes reading map data from a data store. The map data comprising component identifying data and component position data for said 3D components. The component data for the identified components from a data store is read for the component data including 3D geometry data for the components. The plug data is read for a component on the map with one or more interfaces not connected to other components. The 3D geometry data is transformed into various components using said component position data. The transformed data is combined to provide 3D virtual environment data for said 3D virtual environment.

Figure 2:
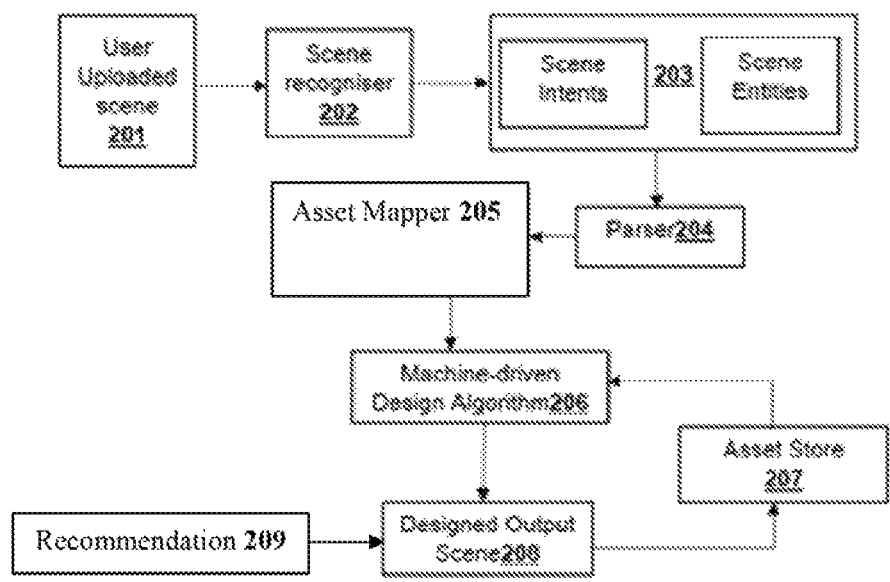
FIG. 2 illustrates a block diagram of the system for generation of the virtual environment, according to one embodiment herein.

FIG. 2 illustrates a block diagram of the system for generation of virtual environment, according to an embodiment herein. The system for generation of virtual environment and providing contextual suggestions in a Virtual and Augmented reality scene includes a scene recognizer, parser, asset mapper, machine learning driven design algorithm, and asset store reorganizer. The system receives a scene 201 uploaded by a user as input. Also, the user is enabled to select scenes from a predefined list of scenes available in the asset store. The selected or uploaded scene is fed as input to the scene recognizer. The scene recognizer 202 analyses the scenes to identify scene intents and scene entity 203. The scene intent comprises of a holistic image recognition of a scene. The scene entity comprises of individual recognized elements in a scene. The intents and entities are provisioned through a parser 204 that converts them into a format compatible with the editor of the asset store. Further, the asset mapper 205 comprises of pre-trained data sets and machine-driven design algorithm 206 that additively generates a new scene from the intents and entities. The new scene generated has 4 unique characteristics such as scene effects, 2D scene element, 3D scene element, and scene descriptor text. In Scene effects, the scene is modified with lighting and visual filters into a desired format. Further, scene elements are provisioned across 3D and 2D elements ranging from volumetric 3D models, shapes and other assets present in the store that enables to define the scene in additional entity driven detail. The generated scenes after applying scene effects, scene elements, and scene descriptor text are displayed to the user as scene one, scene two, scene three for selection. Once the user selects a scene provided by design suggestion, the scene is previewed over the existing option with appropriate toggles to select, unselect and revert selections. On completion of scene selection, the selected output scene 208 is taken into consideration as a weighted average for the asset store 207 to reorganize the contents with reference to the intent and entities provided. This allows for a continuous contextual recommendation process that is constantly updated through the user actions and preferences.

Figure 3A:
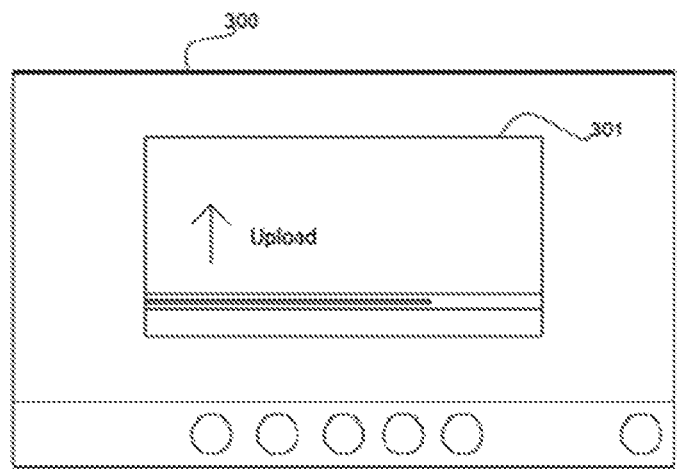
FIGS. 3a to 3e illustrates the sequence of steps involved in the conversion of virtual environment, according to one embodiment herein.
Figure 3B:
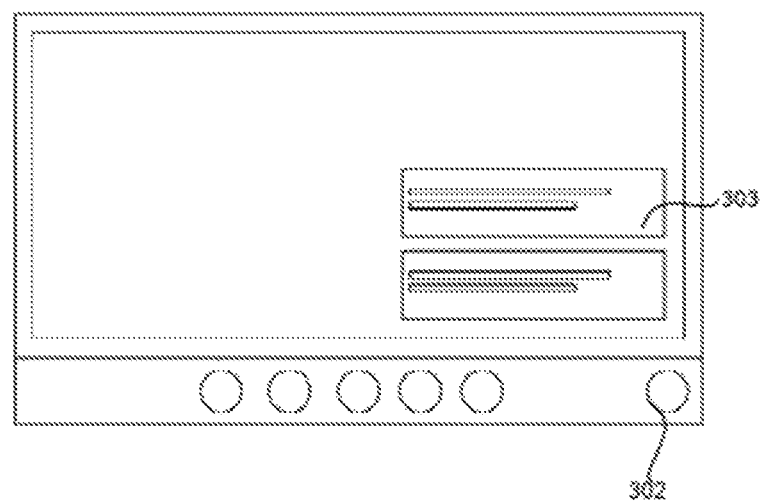
Figure 3C:
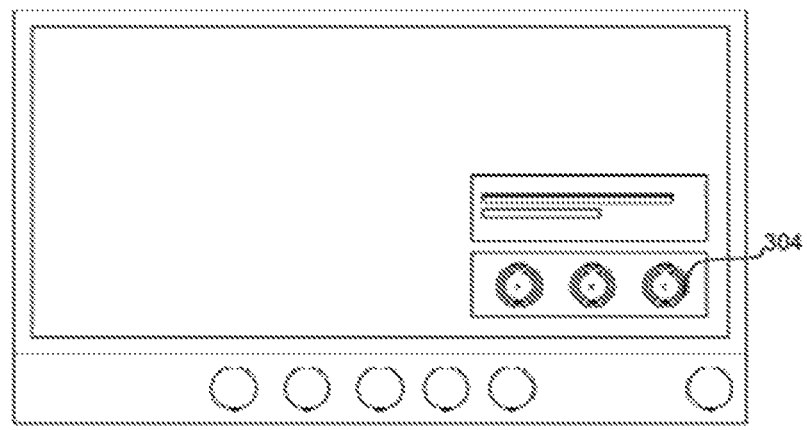
Figure 3D:
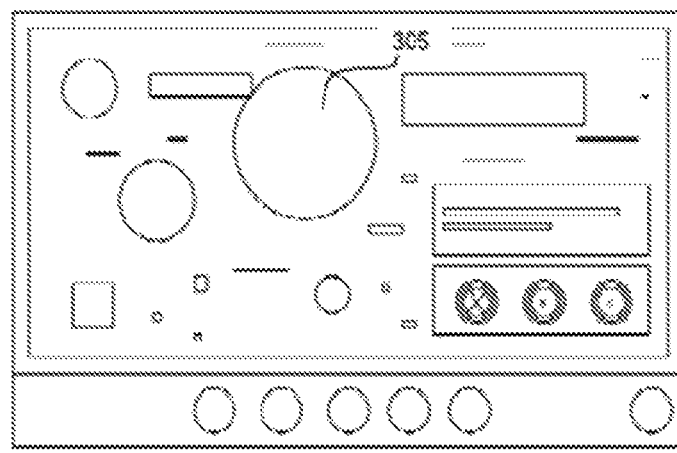
Figure 3E:
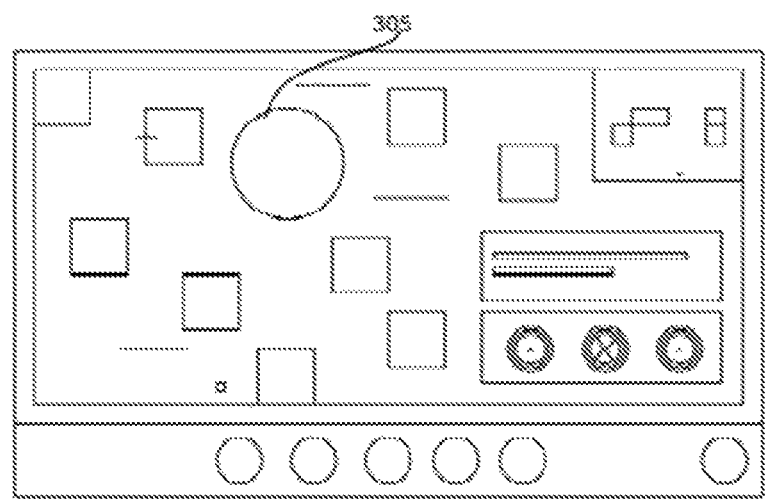

FIGS. 3a to 3e illustrates the sequence of steps involved in the conversion of virtual environment, according to an exemplary embodiment of the present invention. The system is a computing device that receives a 360-degree scene or selects at least one image 301 from a plurality of inbuilt templates through a user interface 300. The system includes an AI chat bot 302, and tool controls to edit the user inputs. Further, the AI analyses the scene input by the user. The AI analyses the intents and entities of the scene and display the information 303 corresponding to intents and entities in a user interface of the computing device as illustrated in FIG. 3b. Thereafter, the AI provides scene recommendations A, B and C for the user (304) as shown in FIG. 3c. The user is enabled to select a scene from the scene recommendations A, B and C. The selected scene option is populated with content 305 corresponding to the 3D components as illustrated in FIGS. 3d, and 3e.

Therefore, the method envisaged by the embodiments herein transforms a 3D geometry data for the plurality of components in a virtual environment. Further, the system envisaged by the embodiments herein enables creating of virtual environment from pre-built and pre-tested three-dimensional (3D) components. The system includes a machine learning algorithm that provides an intelligent scene AI or design assistant to contextually add elements to the created virtual or augmented reality scene. The system provides pre-built and pre-tested 3D components that can be readily arranged based on user requirements. Thus, the system allows a user without technical skills to easily construct a virtual environment by using data specifying assembly of building blocks across a scene.

Further, the embodiments herein comprise data that describes the virtual environment in terms of connected components, a scene can occupy relatively little storage space, for example a few tens of kilobytes, whereas the complete data for a virtual environment such as an application scene typically occupies many megabytes. This facilitates the storage of data specifying a complete virtual environment, and allows such data to be readily exchanged, for example over a computer network. Furthermore, since the virtual environment is constructed using 3D component building blocks whose positions are identified on the map, it is possible in embodiments of the method to generate visually different virtual environments, with different textures and geometries, simply by using a different set of 3D components, providing that the components have the same basic connectivity and, preferably, the same general shape. In a AR/VR experience this allows the theme, appearance, and internal geometry of the virtual environment of a scene to be dramatically changed simply by changing one or a few data bits specifying a set of 3D components to use. The overall layout described by the map remains the same but internal details of the virtual environment are changed.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be the to fall there between.

What is claimed is:

1. A system comprising a hardware processor and memory for generating virtual environment and providing contents/suggestions in a Virtual and Augmented reality scene through one or more applications, the system comprising:
   a scene recognizer module run on a hardware processor and configured for receiving a scene as an input from a user through a software application or algorithm, and wherein the user is enabled to upload one or more new scenes or select one or more existing scenes from a predefined list of scenes available in an asset store, and wherein the scene recognizer is configured is configured for analyzing the one or more scenes to identify scene intents and scene entity;
   a parser module coupled to the scene recognizer, wherein the parser module is run on a hardware processor and configured for converting the scene intents and scene entities into a format compatible with an editor of the asset store through a software application or algorithm;
   an asset mapping module coupled to the parser module, wherein the asset mapping module comprises a plurality of pre-trained data sets and one or more machine learning algorithms, and wherein the asset mapping module is run on a hardware processor and configured for additively generating a new scene from the intents and entities using pre-trained data sets and one or more machine learning algorithms, and wherein the asset store comprises a catalog of 3D component geometry data with one or more visual appearances, and wherein the one or more visual appearances are provided by a plurality of textures, and wherein the 3D component geometry data comprises data for at least two sets of 3D components preferably with the same basic connectivity and general shape but with one or more visual appearances, and wherein each component is theme based, and wherein each 3D component's visual appearance is varied based on the surrounding look and feel;
   a display module coupled to the asset mapper, and wherein the display module is run on a hardware processor and configured for displaying the generated scene to the user for selection through a software application or algorithm, and wherein upon selection by the user, the scene is previewed with appropriate toggles to select, unselect and revert selections for generating the scene with desired effects; and
   a contextual recommendations module run on a hardware processor and configured for providing continuous contextual recommendations based on user actions and preferences through a software application or algorithm, and wherein the contextual recommendations consider selection of choices made by user as a weighted average to recognize the content with reference to intent and entities in the asset store.

2. The system according to claim 1, wherein the scene intent comprises holistic image recognition of the scene and wherein the scene entity comprises one or more individually recognized elements in the scene and wherein the elements in the scene are recognized by identifying 3D component geometry data and position data.

3. The system according to claim 1, wherein the 3D component geometry data of the recognized element is transformed using position data to provide 3D virtual environment data for a specific 3D virtual environment.

4. The system according to claim 1, wherein the 3D virtual environment data defines a substantially contagious 3D surface enclosing the 3D virtual environment.

5. The system according to claim 1, wherein the new scene generated by the system further comprises one or more unique characteristics, and wherein the one or more unique characteristics comprise scene effects, 2D scene element, 3D scene element and scene descriptor text.

6. A computer implemented method comprising instructions stored on a computer readable non transitory storage medium and executed on hardware processor in a computing system for generating virtual environment and for providing suggestions in a Virtual and Augmented reality scene through one or more applications, the method comprising the steps of:
   receiving a scene as an input from a user, and wherein the user is enabled to upload one or more new scenes or select one or more existing scenes from a predefined list of scenes available in an asset store;
   analyzing the one or more scenes to identify scene intents and scene entity, the scene intent comprises holistic image recognition of the scene and the scene entity comprises one or more individually recognized elements in the scene and wherein the recognizing elements in the scene further comprises identifying 3D component geometry data and position data;
   transforming at least one component of the 3D component geometry data using position data to provide 3D virtual environment data for a specific 3D virtual environment; and
   combining the transformed data to provide 3D virtual environment data for said 3D virtual environment; and
   providing continuous contextual recommendations based on user actions and preferences using a contextual recommendations module through a software application or algorithm, and wherein the contextual recommendations consider selection of choices made by user as a weighted average to recognize the content with reference to intent and entities in the asset store;
   wherein selecting the 3D component geometry data comprises selecting a catalog of 3D component geometry data with one or more visual appearances from an asset store, and wherein the one or more visual appearances are provided by a plurality of textures, and wherein the 3D component geometry data comprises data for at least two sets of 3D components preferably with the same basic connectivity and general shape but with one or more visual appearances, and wherein each component is theme based, and wherein each 3D component's visual appearance is varied based on the surrounding look and feel.

7. The method according to claim 6, wherein each component comprises one or more interface portions for interfacing to other components.

8. The method according to claim 6, further comprises the step of enabling component geometry to close the interface when the interface is not used in order to connect to another component using the interface portion, and wherein the interface portion is associated with a plug comprising plug data.

9. The method according to claim 6, further comprises the step of mapping the scenes into a pre-trained dataset using an asset mapper, and wherein the asset mapper is configured for additively generating a new scene from the intents and entities, and wherein the new scene comprises one or more unique characteristics, and wherein the one or more characteristics comprise scene effects, 2D scene element, 3D scene element and scene descriptor text.

10. The method according to claim 6, further comprises the step of displaying the generated scene to the user for selection.

11. The method according to claim 6, further comprises the step of previewing the selected scene to the user with appropriate toggles to select, unselect and revert selections for generating the scene with desired effects.

* * * * *